US009969003B2

(12) United States Patent
Binder et al.

(10) Patent No.: US 9,969,003 B2
(45) Date of Patent: May 15, 2018

(54) PROCESS FOR MANUFACTURING A POROUS BODY BY POWDER METALLURGY AND METALLURGIC COMPOSITION OF PARTICULATE MATERIALS

(71) Applicant: Universidade Federal De Santa Catarina (UFSC), Florianopolis (BR)

(72) Inventors: Roberto Binder, Joinville (BR); Aloisio Nelmo Klein, Florianopolis (BR); Arcanjo Lenzi, Florianopolis (BR); Cristiano Binder, Florianopolis (BR); Irene Cristina Magnabosco Mocellin, Florianopolis (BR); Rodrigo Pereira Becker, Florianopolis (BR); Paulo Henrique Mareze, Florianopolis (BR)

(73) Assignee: Universidade Federal De Santa Catarina (UFSC), Florianopolis-SC (BR)

( * ) Notice: Subject to any disclaimer, the term of this patent is extended or adjusted under 35 U.S.C. 154(b) by 928 days.

(21) Appl. No.: 14/366,539

(22) PCT Filed: Dec. 19, 2012

(86) PCT No.: PCT/BR2012/000531
§ 371 (c)(1),
(2) Date: Jun. 18, 2014

(87) PCT Pub. No.: WO2013/091055
PCT Pub. Date: Jun. 27, 2013

(65) Prior Publication Data
US 2015/0023828 A1    Jan. 22, 2015

(30) Foreign Application Priority Data

Dec. 20, 2011   (BR) ............................... PI1105355-0

(51) Int. Cl.
*B22F 3/11*     (2006.01)
*B22F 3/12*     (2006.01)
(Continued)

(52) U.S. Cl.
CPC .............. *B22F 3/1143* (2013.01); *B22F 3/12* (2013.01); *B22F 3/24* (2013.01); *C04B 38/0605* (2013.01);
(Continued)

(58) Field of Classification Search
CPC .................................. B22F 3/11; C04B 38/06
See application file for complete search history.

(56) References Cited

U.S. PATENT DOCUMENTS 2,065,618 A    12/1936 Sherwood
2,133,761 A *  10/1938 Tietig .................... B22F 3/1143
                                                   102/511
(Continued)

FOREIGN PATENT DOCUMENTS

CA      2355790 A1    2/2003
CA      2469244 A1   12/2004
WO     03015963 A1    2/2003

OTHER PUBLICATIONS

International Search Report dated Apr. 4, 2013, International Application No. PCT/BR2012/000531.

*Primary Examiner* — Christopher Kessler
(74) *Attorney, Agent, or Firm* — Harrington & Smith

(57) ABSTRACT

The process comprises the steps of: mixing a load of oxide ceramic material particles (10) with a load of space holder particles (20), defined by graphite and/or amorphous carbon; compacting the mixture formed by ceramic material particles (10) and space holder particles (20), to form a compact body (E); and sintering said compact body (E), so that the ceramic material particles (10) form sintering contacts with (Continued)

each other, whereas the carbon of the space holder particles (20) is removed by the reaction with the oxygen in the sintering medium, to form open secondary pores (II), by eliminating the space holder particles (20). The metallurgic composition comprises the mixture of the ceramic material particles (10) with the space holder particles (20).

5 Claims, 6 Drawing Sheets

(51) Int. Cl.
  *B22F 3/24* (2006.01)
  *C04B 38/06* (2006.01)
  *C22C 9/00* (2006.01)
  *C22C 19/03* (2006.01)

(52) U.S. Cl.
  CPC .......... *B22F 2003/248* (2013.01); *C22C 9/00* (2013.01); *C22C 19/03* (2013.01)

(56) References Cited

U.S. PATENT DOCUMENTS

| | | |
|---|---|---|
| 2,917,384 A | 12/1959 | Ferdinand |
| 3,796,565 A | 3/1974 | Hancock et al. |
| 4,508,761 A * | 4/1985 | Miyoshi ................ C08F 292/00 264/109 |
| 5,213,612 A | 5/1993 | Minnear et al. |
| 5,848,351 A | 12/1998 | Hoshino et al. |
| 5,930,580 A | 7/1999 | Everett |

* cited by examiner

PROCESS FOR MANUFACTURING A POROUS BODY BY POWDER METALLURGY AND METALLURGIC COMPOSITION OF PARTICULATE MATERIALS

FIELD OF THE INVENTION

The present invention refers to a process developed to allow manufacturing, at a relatively low cost, a metallic or eventually ceramic porous body to be used, for example, in the formation of an acoustic muffling element, designed to provide acoustic absorption in different applications as, for example, in hermetic refrigeration compressors. The porous body, for the formation of the acoustic muffling element, was developed to reduce the level of noise in compressors and other mechanical systems, by absorbing the sound waves in the porous structure of the acoustic muffling element, converting the energy of the sound wave into heat. The porous body, for the formation, for example, of the acoustic muffling element, is manufactured by the powder metallurgy techniques, by using a metallurgic composition of particulate materials, defined by a mixture of graphite powder (carbon) with the powder of a ceramic material of the type easily reducible by hydrogen or carbon, such as the oxides of Ni, Cu, Sn, Zn Mo and W, and mixtures thereof, allowing, if necessary, the reduction of said oxides to metal during the sintering process.

BACKGROUND OF THE INVENTION

At present, it has been growing the concern about attenuating the noise in electric household appliances, automobiles, aircrafts, equipment and machines in general. Said concern results not only from the need to increase the comfort of the consumer, but also due to norms and regulations established by the regulatory agencies defining more severe limits to the admissible noise levels for each type of specific medium.

Sound waves may be absorbed in porous materials and in viscoelastic materials, attenuating the noise levels by absorbing said sound waves.

The use of porous elements for acoustic absorption, manufactured in metallic (or eventually ceramic) materials, tends to be more effective when submitted to higher loads and working temperatures, since said materials have higher mechanical and heat strength than the commonly used elements formed of polymers. Besides, the acoustic muffling elements in metallic and/or ceramic material are easier to be incorporated to traditional mechanical systems.

In engineering, the term "porous materials" is used to designate the materials whose engineering function is made possible by the presence of pores. The pores may be of the primary and secondary type. There are considered primary the pores which are residual, remaining from sintering the powder particles to each other. The size and volumetric percentage of the primary pores result directly from the size of the powder particles used for manufacturing the material and from the processing parameters used (compaction pressure, sintering time and temperature, among others). The referred secondary pores are generated inside the volume of the material, by eliminating the space holders mixed to the matrix powder during the step of preparing the material. In porous materials, the pores may also be classified in pores of the closed type (insulated from the exterior of the material) and pores of the open type (communicating with each other and with the exterior).

The materials which contain only closed pores are applied as a structural support, and the materials with open pores are mainly applied where the passage of fluid is necessary, such as in filtration, catalyst supports, thermal and acoustic insulation, deposition of lubricant (in self-lubricating bushings), and the like. The particular process, used to produce the porous materials, defines the properties and porous structure of said materials, such as type of porosity (open or closed), volumetric percentage of the pores, dimension and shape of the pores, uniformity and connectivity of the pores.

Porous materials, with open porosity, may be manufactured by the processing routes, such as replica, deposition of material (INCOFOAM), or by mixing a two-phase composite, constituted by a continuous matrix of homogeneously dispersed metallic or ceramic particles, with a space holder, or also by the rapid prototyping technique. Materials with closed pores may be produced by combining a metallic or ceramic matrix with hollow spheres ("synthetic foams"), compacting the alloy powder mixtures with foaming agents, sintering the loose powder (not compacted) within a die, or with a material in liquid state, by injecting gas directly in the liquid-state metal or by adding a pore forming agent.

Several alternative processing methods for the production of porous materials have been proposed over the years. However, for the particular application intended in the present invention, that is, the acoustic absorption in equipment or machines such as, for example, hermetic compressors, the finished porous components should have low cost, should be produced in large scale and by a cost-effective and high productivity process. Furthermore, the raw-material used should have a low cost. Therefore, the powder metallurgy is presented as a process for manufacturing finished components with great potential. However, the high open porosity, which is required for the porous body of the acoustic muffling element, cannot be achieved only by adjusting the parameters of the powder manufacturing process, such as compaction pressure, sintering time and temperature, which parameters are related only to obtain the primary pores. In order to achieve a high percentage of porosity, comprising secondary open pores, besides the primary pores eventually opened (communicating with each other and with the exterior), it is necessary to add a space holder to the particulate material composition to be sintered.

For the development of porous bodies with an efficient acoustic absorption, it should be considered their behavior regarding the degree of acoustic absorption resulting from the morphological characteristics of the porous structure of the muffling element, which behavior may be predicted through simulations by using analytical models of acoustic propagation as, for example, the Zwikker/Wilson model for the acoustic propagation in porous materials presenting a rigid structure. For the exemplary application in the discharge of a hermetic refrigeration compressor, the simulations indicate that the highest coefficient of acoustic absorption in metallic porous bodies occurs, for a volumetric percentage of communicating pores (open) between 45% and 60%, when the interconnected pores present a diameter between 20 μm and 60 μm. Said information was relevant as a starting point to carry out the experimental development of the material of the present invention, aiming at obtaining a porous structure theoretically more appropriate for the acoustic absorption.

As mentioned above, for the exemplary application in hermetic compressors, among all the techniques for manufacturing porous materials, the one which shows a high potential for a cost-effective scale production of the porous elements, having the specified porous structure, is the technique of powder metallurgy. The powder metallurgy presents a wide variety of different techniques for the formation or consolidation of the "feedstock" in a finished or semi-finished component: uniaxial compaction in matrices, isostatic compaction, rolling, extrusion and injection of powders, barbotine gluing, and others. The compaction process, via uniaxial pressing in a matrix, is considered the most appropriate, for presenting, as main characteristic, the feasibility of a cost-effective serial production of elements (pieces) with final dimensions and geometry, since the process can be easily controlled and automated, further allowing the desired microporous structure to be easily produced, by mixing the space holder, in the form of powder, to the metallic or ceramic matrix powder.

The manufacture of metallic porous elements, formed by powder metallurgy and presenting open primary pores and open secondary pores, uses raw material in the form of metallic powders as a matrix phase, instead of ceramic powders, which is used by the present invention, as discussed ahead. However, the metal powders, especially when required to be very fine, as in the present case, are costly, making economically unfeasible to obtain the porous components of low cost for application in commodities.

Considering the need, in almost all applications, to form a rigid metallic porous element, the material commonly used in the known prior art techniques is defined by a fine metallic material powder as, for example, a powder of iron, copper, nickel, molybdenum, tungsten, cobalt and mixtures thereof, having a known very high cost and, thus, generally not economically interesting.

SUMMARY OF THE INVENTION

In face of the difficulties mentioned above and related to the current state of the art, the present invention has the object to produce, by sintering and at an acceptable cost, porous elements presenting primary pores and secondary pores, from a metallurgic composition comprising: ceramic powders capable to form, in the sintering, a metallic matrix; and a space holder homogeneously distributed in the volume of the ceramic powder mixture and which is capable to form, in the sintering, a structure of secondary pores communicating with each other in the volume of the metallic matrix.

The invention has also the object to provide a metallurgic composition as defined above.

These and other objects are achieved through a process for manufacturing a porous body, by powder metallurgy, comprising the steps of: mixing, homogeneously and in predetermined amounts, a load of particles of an oxide ceramic material, reducible by a reducing agent selected from carbon and hydrogen, with a load of particles, as a space holder, and selected from graphite and/or amorphous carbon; compacting said mixture formed by ceramic material and graphite particles, so as to form a compact body (green piece) having the form of the porous acoustic muffling element to be sintered; and sintering said compact body, so that the ceramic material particles form sintering contacts with each other, whereas the carbon, of the graphite particles and/or of the amorphous carbon, is removed by reaction with the oxygen available in the sintering medium, in the form of $O_2$ or as oxygen present in the particles of the oxide ceramic material, in order to form open secondary pores, by the elimination of the graphite particles and/or amorphous carbon.

The space holder is mixed to the ceramic powder to generate secondary pores, playing the role of space holder in the green compact. The space holder may be removed from the material, leaving secondary pores in its place, in two distinct ways: a) by its reaction with the oxygen of the atmospheric air, during the material sintering, when the latter is carried out in air; b) by its reaction with the oxygen contained in the oxide particles of the matrix (self-reducing material)(forming carbon dioxide and monoxide), during sintering; c) by the reaction with hydrogen, when a sintering atmosphere containing hydrogen is used; and d) by the reaction with steam when treated in atmosphere with high humidity content.

When sintering is carried out in atmospheric air, after the graphite is totally removed by its reaction with the oxygen of the air, the material results in a porous skeleton, formed by the oxide particles being sintered to each other. The oxide-based porous skeleton is then reduced to metal, by a thermochemical treatment in hydrogen, maintaining intact its porous structure. The oxides with low free energy of formation (easily reducible), which are used in the present invention, are the oxides of Fe, Ni, Cu, Sn, Zn, Mo, W, and mixtures thereof.

The present invention further provides a metallurgic composition of particulate materials for forming, by powder metallurgy, a compact and sintered porous body of an acoustic muffling element, said composition comprising a particle mixture of an oxide ceramic material, reducible by a reducing agent selected from carbon and hydrogen, with space holder particles defined by graphite and/or amorphous carbon, said ceramic material particles presenting dimensions between 0.01 µm and 15 µm which are capable of forming a matrix phase of the compact body to be sintered, said space holder particles, of graphite and/or of amorphous carbon, presenting dimensions between 14 µm and 150 µm and each being capable of defining a space holder portion to be eliminated from the body, during the sintering of the latter.

BRIEF DESCRIPTION OF THE DRAWINGS

These and other objects and advantages of the present invention will be more clearly understood, with reference to the enclosed drawings, given by way of example of the invention and in which.

DESCRIPTION OF THE INVENTION

As already previously mentioned, the process of the present invention comprises the preparation of a two-phase composition, from a matrix phase MP, defined by a load of ceramic material particles 10 obtained from an oxide with low free energy of formation and which is easily reducible by a reducing agent selected from hydrogen or carbon, and from a space holder SH, in the form of a load of space holder particles 20 selected from graphite and/or amorphous carbon, to be thermally removed during the formation process, by powder metallurgy, of a compact and sintered porous body E of an acoustic muffling element (not illustrated). The space holder particles 20 of the space holder SH are homogeneously dispersed in the load of ceramic material particles 10 which defines the matrix phase MP.

According to the process of the invention, a load of oxide ceramic material particles 10, easily reducible by a reducing agent selected from carbon and hydrogen, is mixed, homogeneously and in predetermined quantities, with a load of space holder particles 20.

Subsequently, the process includes a step for compacting said mixture formed by ceramic material particles 10 and space holder particles 20, so as to form a body E of compact particles, having the form of the porous acoustic muffling element to be sintered.

When the carbon of the space holder SH is removed during the sintering thermal treatment, it forms, in its place, only open (communicating) secondary pores II, since the percentage of carbon is generally very high and the pores communicate with each other, resulting in a porous structure with open pores which communicate with each other and with the exterior of the porous element.

The control of the processing parameters, such as the volumetric percentage of space holder particles 20 of the space holder SH, said particles being defined by graphite and/or amorphous carbon, the size and shape of said particles, the compaction pressure in the step of shaping the body E for the formation of the acoustic muffling element to be produced, the sintering time and temperature, are of fundamental importance for obtaining the metallic elements with the porous structure appropriate for the engineering function (in this case, noise absorption). Moreover, the acoustic muffling element requires a mechanical strength, sufficient for its specific application and which results from the appropriate combination of the processing parameters and the metallurgic composition used.

Figure 1:
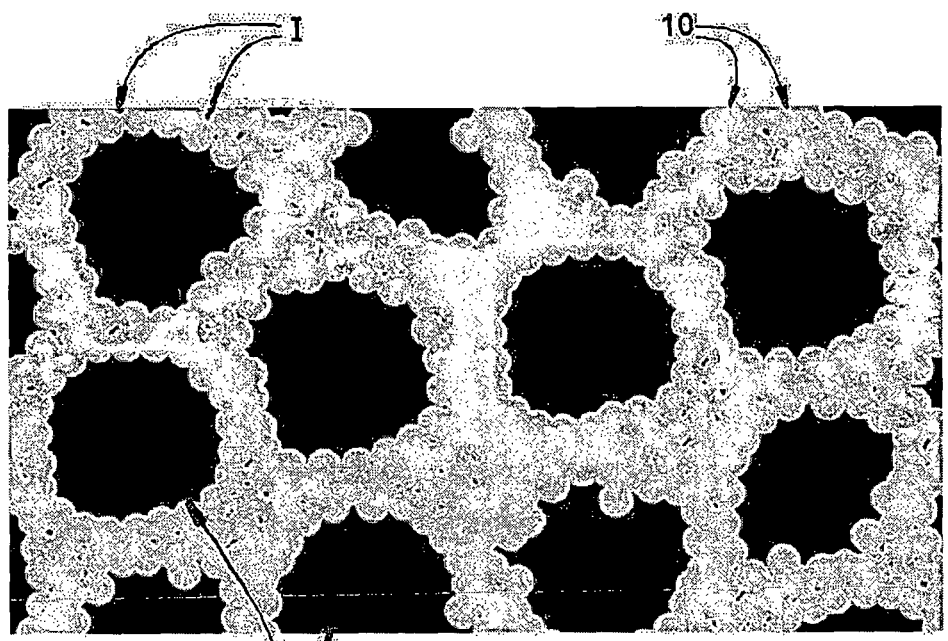
FIG. 1 is a schematic representation of the porous structure of a metallic or eventually ceramic body to be used, for example, in the formation of an acoustic muffling element presenting small primary pores between the powder particles sintered to each other and large secondary pores, generated by the use of a space holder.
Figure 3:
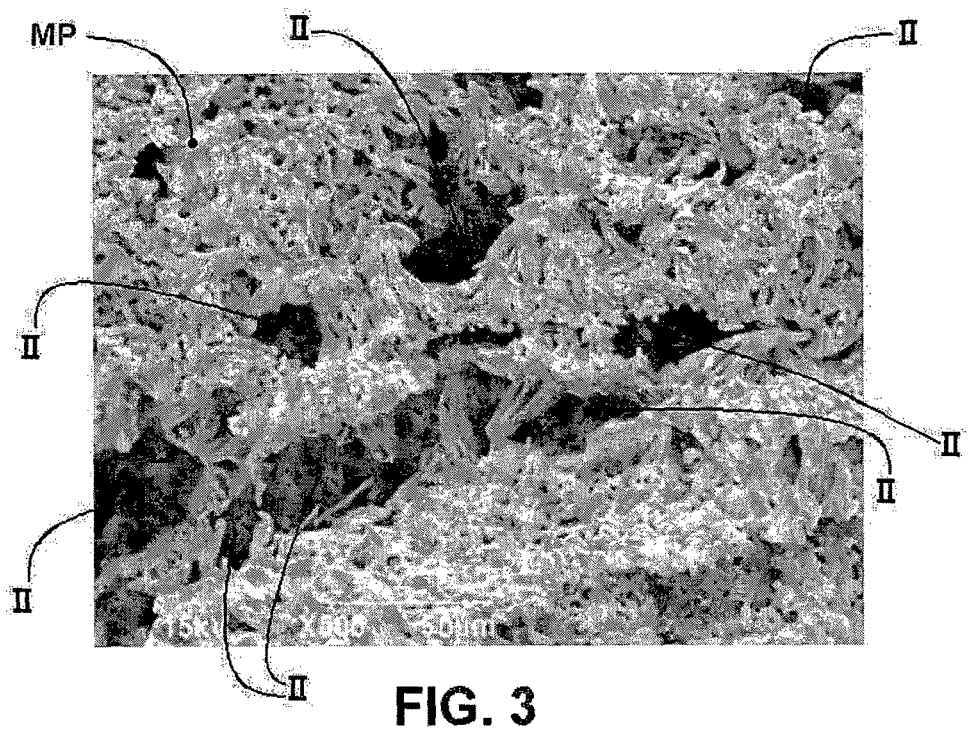
FIG. 3 represents a micrograph of the porous structure obtained in the body for the formation of a muffling element, using the graphite as space holder and presenting open and communicating secondary pores, formed by removal of the carbon (in the graphite form)
Figure 4:
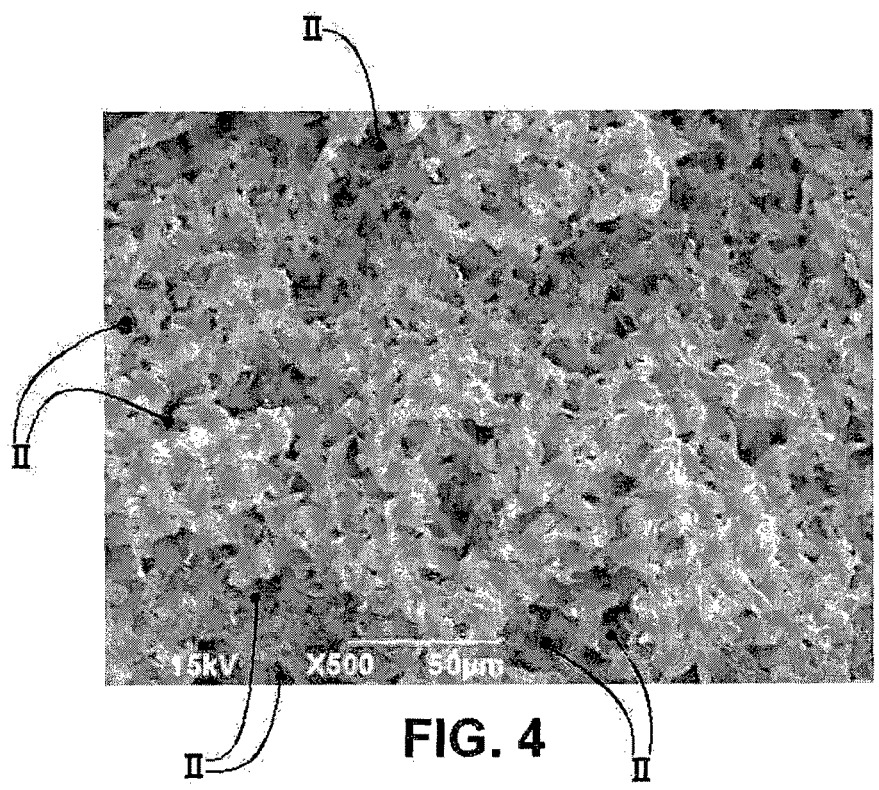
FIG. 4 represents a micrograph of the porous structure of another body for the formation of a muffling element, using the graphite as a space holder and presenting a porous structure different from the previous one, with flat open secondary pores resulting from the shearing of the graphite, during the step of forming the metallurgic composition.
Figure 5:
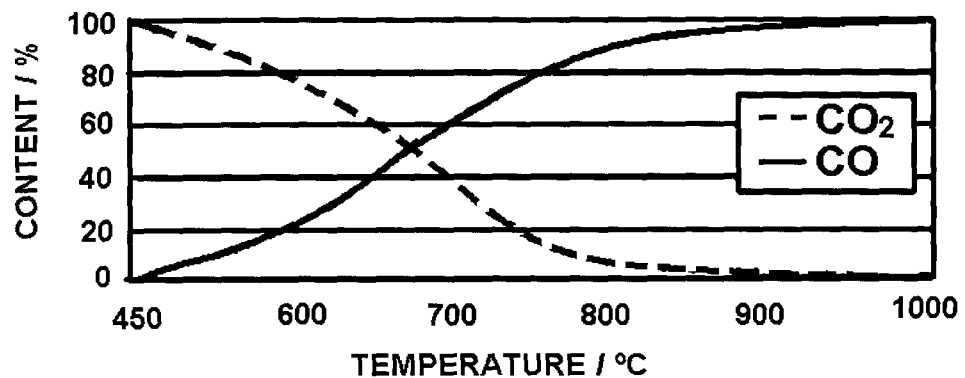
FIG. 5 represents a graph of the Boudouard equilibrium, as a function of the temperature.

An acoustic muffling element having a porous body E which has, at the same time, mechanical strength sufficient for the intended application and high volumetric percentage of open (communicating) secondary pores II for an efficient acoustic absorption, should present a continuous solid structure, formed by the matrix phase MP resulting from sintering, to each other, the ceramic material particles 10, and presenting open secondary pores II (FIGS. 1, 3 and 4).

In the embodiment illustrated in FIG. 4, the space holder particles 20, which define the space holder SH, in graphite, have their shape modified, by shearing, during the formation of the initial metallurgic composition, allowing the open secondary pores II, which are formed upon sintering the body E of the acoustic muffling element, to present an elongated and flat shape, which varies as a function of the control of said shearing, so as to increase the degree of continuity of said open secondary pores II and, thus, the acoustic muffling capacity of the porous material. It should be understood that the degree of continuity of the open secondary pores II, obtained by the degree of deformation, by shearing, of the space holder particles 20 of the space holder SH, is established to allow for a balance between the muffling characteristics and the structural strength required for the body E of the acoustic muffling element to be obtained.

On the other hand, not shearing the space holder particles leads to the formation of secondary pores, having larger average diameter and which are less elongated and less flattened, such as those illustrated in FIGS. 1 and 3, which have lower acoustic absorption efficiency.

The powder of the ceramic material particles 10, used for the matrix phase MP, should be very fine (of about 0.2 to 15 micrometers) to allow the formation of totally continuous thin particle layers of the matrix between the particles of the space holder SH, allowing forming a porous element, in which both the matrix solid phase (the resulting metallic skeleton) and the hollow phase (the phase represented by the communicating pores) are continuous, that is, two intersecting continuous phases. Moreover, the use of this original fine powder allows for an efficient sintering between the particles which form the continuous solid phase, resulting in a higher mechanical strength of the latter and, as a consequence, of the porous element.

Another reason for the particles, which are used for the matrix phase MP, to be very fine is that the solid phase occupies less then half the volume since, between two consecutive space holder particles 20 of the space holder SH, the particle layer of the matrix phase MP will be relatively thin. However, due to the fine powder used, this layer, even being thin, is constituted by a high number of contiguous particles in the thickness direction (dozens), allowing sintering a solid skeleton with sufficient strength.

Since metallic particles (powders) of iron or other metals, presenting very small particle size (of about 0.2 to 15 micrometers), are very expensive, due to its particular manufacturing process (ex.: carbonyl process when iron and nickel are used), it was proposed the use of ceramic material powder, for example, iron oxide powder, that is, $Fe_2O_3$, which is abundant, of low cost and easily comminuted by mechanical milling, due to its fragility. However, the use of iron oxide particles, instead of iron metallic particles, requires a step of thermochemical treatment for reducing said iron oxide particles to metal.

Figure 2:
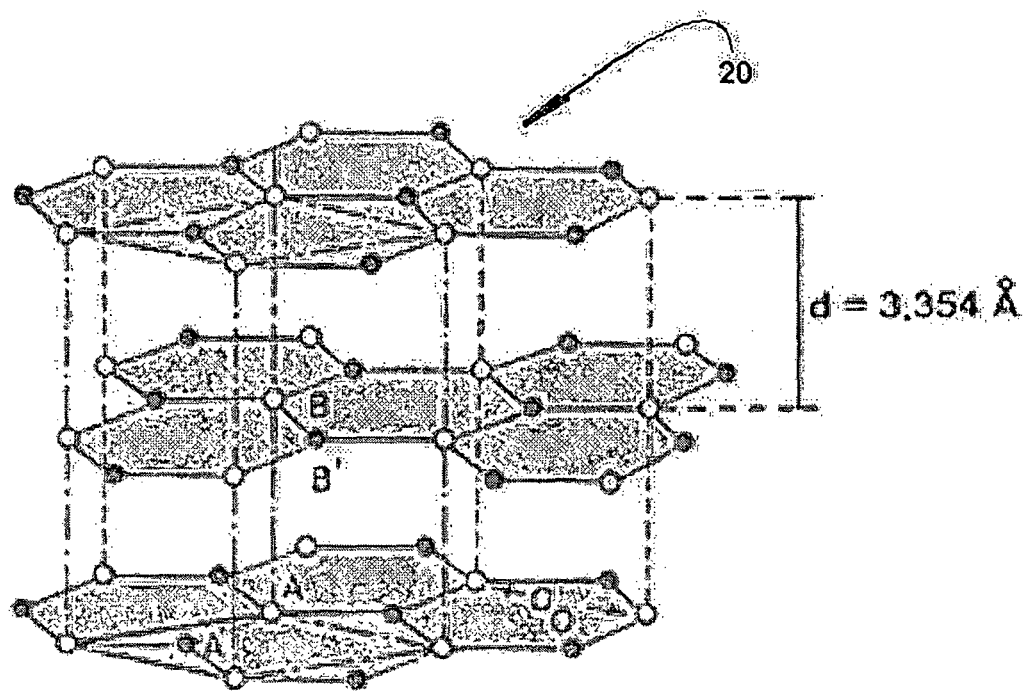
FIG. 2 is a schematic representation of the crystalline structure of the graphite which defines the space holder.

As space holder SH, it was used the graphite, which is a lamellar material presenting the carbon atoms disposed in a hexagonal crystalline lattice, arranged so as to construct a three-dimensional structure, as can be seen in FIG. 2. The carbon atoms are bonded by covalent bonds with sp2 hybridization in the basal planes, resulting in a distance between the atoms of about 1.42 Å in the basal planes of the hexagonal structure. The distance which separates the graphite basal planes, which bind to one another through interactions of the Van der Waals type, is of about 3.354 Å. These bonds are weak, allowing the layers to easily shear relative to each other, by application of a shearing force, which can be produced during the step of mixing, homogeneously, the space holder particles 20 of the space holder SH in graphite with the particles of the matrix phase MP, defined by a reducible oxide.

The presence of space holder particles 20 in the mixture of particles (powders) to be processed, interferes in the result of the steps of processing particulate materials, due to their low mechanical strength to shearing. This occurs both in the step of mechanical homogenization of the particles (powders) in a mixer, and in the step of compaction (pressing) of the metallurgic composition of the particles of the matrix phase MP, and of the space holder particles 20, in graphite, for shaping the body E of the acoustic muffling element to be formed. The space holder particles 20 in graphite have their shape deformed, by shearing, due to the mechanical forces present, which do not allow maintaining the original shape of the particles added. As a result of the shearing, the graphite spreads, taking the form of lamellas between the particles of the matrix phase MP (powders of the matrix phase).

The easy shearing of the space holder particles 20, in graphite, can be beneficial in some cases or applications. In the field of ferrous powder metallurgy, for example, when it is desired to produce sintered steel, containing carbon in its composition, the latter is mixed to the particles (powders) of the ferrous matrix, in the form of graphite particles and, during the step of mechanical homogenization of the particle mixture, the graphite gradually increases its total area of contact with the iron powder particles by shearing. As a consequence, the dissolution of the carbon during the sintering of the steel is facilitated.

However, in composite materials in which graphite is added as the solid lubricant phase, the carbon may be dissolved in the matrix and, furthermore, the particles should remain intact, that is, they should not have its shape deformed, by shearing, and thus spread in the form of thin films between the particles of the matrix phase. The redistribution of the solid lubricant phase (and even any other insoluble phase) by shearing, resulting in lamellas between the powder particles of the matrix phase, is structurally undesirable, since it reduces the metal-metal contact between the particles of the matrix phase MP. The reduction of the contacts between the oxide particles of the matrix phase MP would impair the formation of a continuous matrix (continuous structure) in the sintering, with losses in terms of mechanical strength for the sintered component, since the matrix phase MP is the structural phase which confers mechanical strength to said component.

Regarding the production of porous materials, when space holder particles 20 are used as a space holder SH for generating communicating open secondary pores II in the material, by the posterior removal thereof, the low shearing stress can be considered a threat when it is desired to obtain pores having a shape similar to the shape of the space holder particles 20 added to the ceramic material particles 10. However, depending on the desired porous structure, said threat can be considered an opportunity, since, by shearing, it is possible to generate different porous structures, as for example, elongated and flat open secondary pores II (FIG. 4), resulting in a higher degree of intercommunication of the porous structure. This particular shape of the open secondary pores II can be also finely adjusted by controlling the shearing intensity, as a function of the shearing forces applied to the metallurgic composition, and of the processing time used in the mixture phase. This advantage was used, in an unprecedented way, in the development of the present work, as a consequence of the fact that the space holder SH used, that is, the graphite, is a shearable lamellar solid which allows manipulating the distribution and the shape of the secondary pores II.

Figure 8:
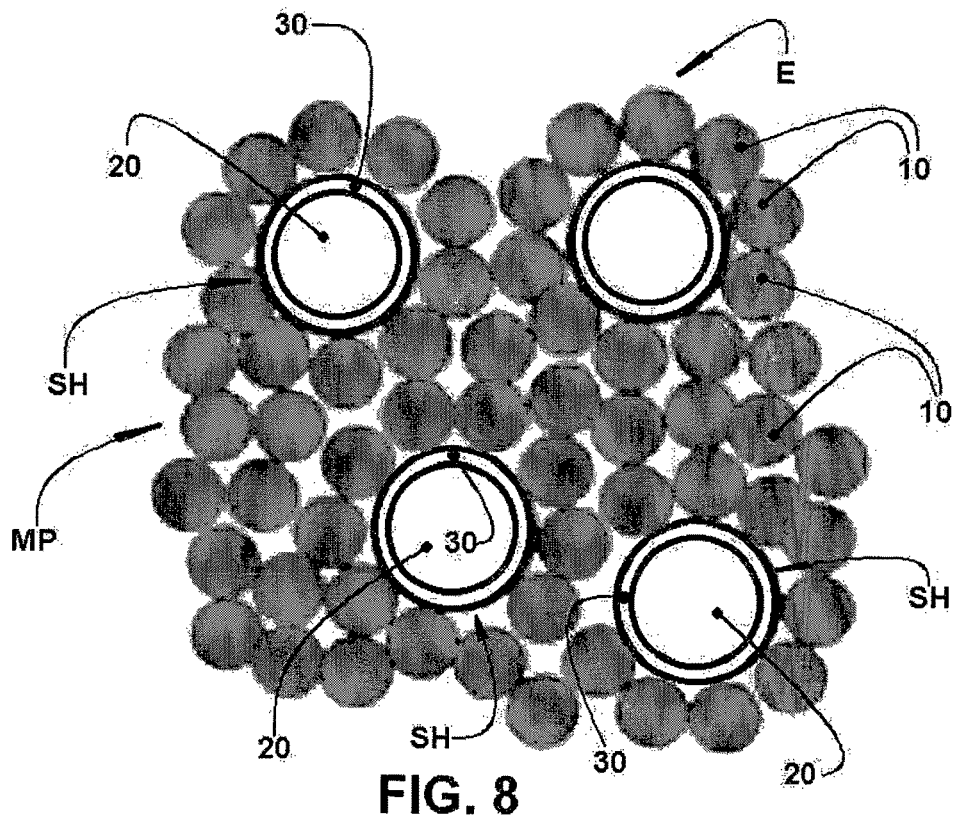
FIGS. 8 and 9 are schematic representations of a structure portion of a body for the formation of an acoustic muffling element, illustrating the condition in which the space holder is dispersed in the matrix phase, before sintering, and a condition in which the space holder was eliminated, resulting in communicating (open) secondary pores in the sintered structure.

However, when necessary, the shearing of the space holder SH can be avoided or reduced by applying a coating 30 on the graphite particles with a polymeric material, as illustrated in FIG. 8. The efficiency of the coating 30 in reducing the shearing depends on the type of polymer used and on the thickness of the polymeric film deposited. The artifice of using the polymer coating 30 to control the shearing of the material of the space holder SH was also unprecedently used in the present work.

In case the space holder particles 20 are defined in amorphous carbon, as for example, carbon black or soot, the coating 30 of said particles can be further used to reduce the deformation of the particles of the space holder SH and their spreading, during any of the steps of mixing with the ceramic material particles 10 and of compacting for shaping the body E to be sintered.

The most indicated polymers are those soluble in water, as the PVA, and the amount to be added ranges from 0.5% to 3% by weight, which value is expressed on the total graphite. The space holder particles 20 may be coated, for example, with PVA, before being mixed with the iron oxide powder (or with the other oxides mentioned in the present invention).

The reduction of the matrix and the removal of the space holder SH can be made by two different methods: 1) reducing the oxide of the matrix phase MP and removing, simultaneously, the space holder SH, that is, removing the carbon from the space holder particles 20; and 2) removing the carbon from the space holder particles 20 to the atmosphere reigning in the sintering medium and reducing, posteriorly, the oxide of the ceramic skeleton of the matrix phase MP, already sintered and presenting communicating open secondary pores II.

The first method used is the self-reduction, according to which the ceramic material particles (powders) 10, of the compact and conformed porous body, are transformed into metal by reaction of the carbon of the space holder particles 20 (that is, the space holder) with the oxygen of the oxide particles which form the matrix phase MP. Thus, in this first method, the reduction of the oxide of the matrix phase MP is made simultaneously to the formation of the communicating open secondary pores II, during the step of sintering the porous body, formed by the compaction and conformation of the metallurgic composition defined by the mixture formed by the ceramic material particles 10 and the space holder particles 20.

With the reduction of the oxide of the matrix phase MP, for example, the iron oxide, the latter is transformed into metal or pure iron, through chemical reactions involving the solid state (carbon—direct reduction).

The second method relates to produce, first, the communicating secondary pores II, by reaction of the carbon of the space holder SH, that is, the graphite and/or amorphous carbon, with a decarbonizing agent in the gaseous state, as for example, oxygen or steam, present in the atmosphere of the sintering medium of the compact (conformed) porous body. In this case, the sintering of the compact body E (green piece) is carried out in atmospheric air flow at temperatures from 750° C. to 1,100° C.

After the formation of the open secondary pores II, communicating with each other and with the exterior, during the sintering, the ceramic skeleton has its oxide matrix phase MP reduced by reducing gases, for example, hydrogen, defining the atmosphere in the medium in which the body E for the formation of the already sintered acoustic muffling element is subjected to this reduction. In this method, the samples are sintered in a specific gaseous atmosphere, to promote the oxidation of the carbon, resulting in the generation of open secondary pores II, communicating with each other and with the exterior, and in the formation of small contacts between the oxide particles of the matrix phase MP, creating a ceramic porous element which, in a second step, is reduced, forming a metallic structure, by means of gaseous reducing agents (indirect reduction ($H_2$)).

In sintering by self-reduction, many mechanisms or ways were proposed with the purpose of explaining the interaction of two solids (oxide and carbon), at temperatures between 800° C. and 1000° C., with the formation of a metallic structure.

The oldest and most frequent way for reducing an oxide, according to L'VOV, is through the formation of gases, such as CO and $CO_2$, according to the following reactions:

$$MO_{(s)} + CO \rightarrow M_{(s)} + CO_2 \quad (1)$$

$$CO_2 + C_{(s)} \rightarrow 2CO \quad (2)$$

The reaction occurs, preferably, via gaseous intermediates (CO and $CO_2$), the oxygen of the iron oxide being removed by the carbon monoxide (CO which, in turn, was generated through the direct reaction of the oxide with carbon), forming carbon dioxide ($CO_2$), which oxidizes the carbon, forming new quantities of carbon monoxide, allowing proceeding with the reduction of the oxides to metallic materials. The L'VOV-Boudouard reaction (2) is an important step in the process of reducing the iron oxide. The concentration of CO and $CO_2$, determined by the Boudouard equilibrium, is temperature-dependent, as can be seen in table 1.

TABLE 1

| | Boudouard Equilibrium | | | | |
| --- | --- | --- | --- | --- | --- |
| | 450° C. | 600° C. | 800° C. | 1000° C. | 1100° C. |
| $CO_2$ (% vol) | 98 | 77 | 6 | 0.7 | 0.2 |
| CO (% vol) | 2 | 23 | 94 | 99.3 | 99.8 |

Figure 6:
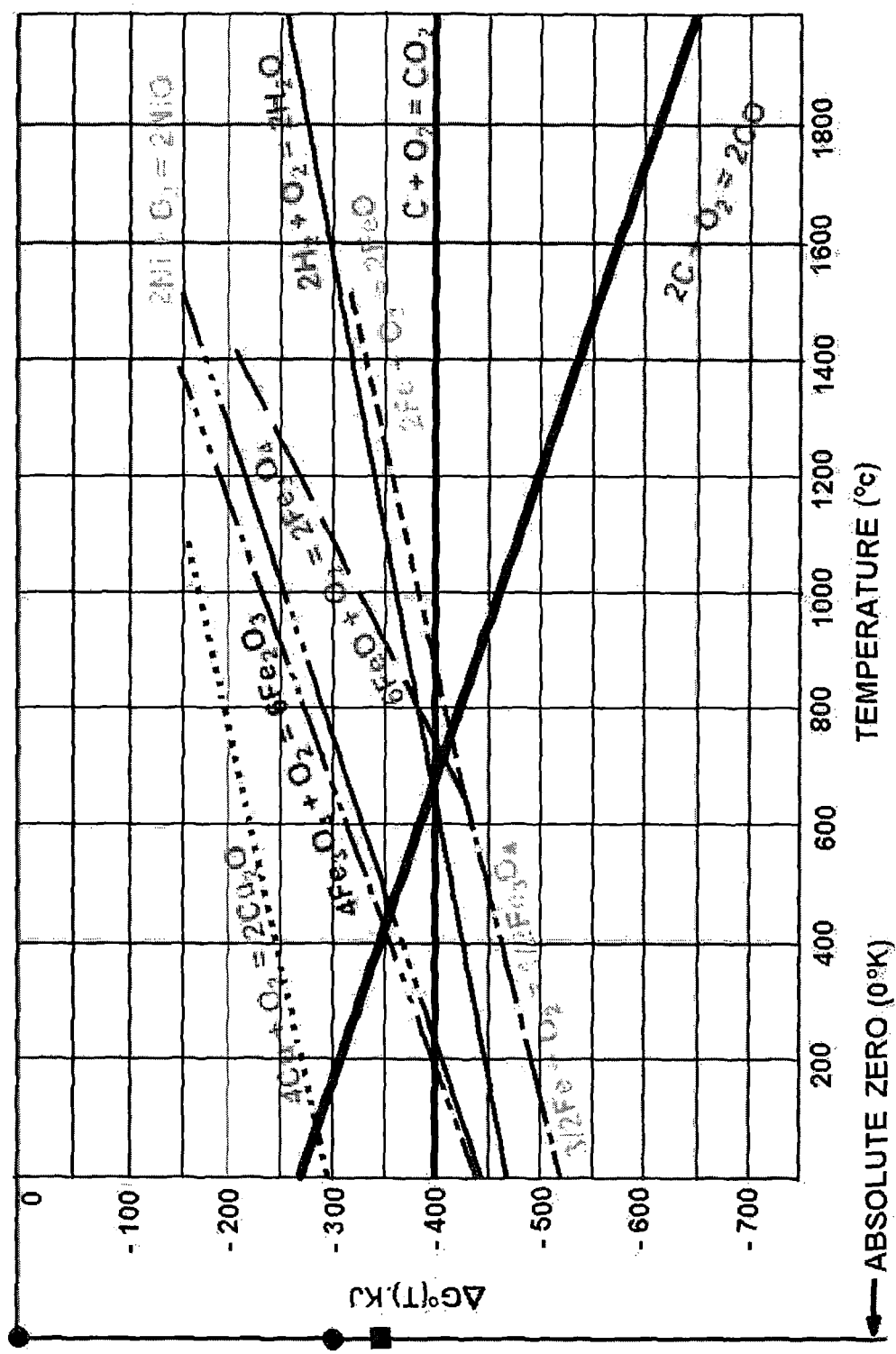
FIG. 6 represents the Ellingham diagram, showing the stability of the oxides of three (Copper, Iron and Nickel) of the main elements of the invention.

The dependence of the reaction (2) on the temperature can be further represented in FIG. 6. At high temperatures, the reaction equilibrium is more favorable to CO emission, whereas, at low temperatures, it is predominant the formation of $CO_2$.

The activation energy of the reactions can be calculated by the Arrhenius equation:

$$K_r = K_o e^{-E_a/R_g T}$$

where $K_r$ is the constant rate, $K_o$ is the frequency factor, $R_g$ is the gas constant and T is the absolute temperature. The value of the activation energy ($E_a$), for the initial reduction stages, is of about 69 KJ/mol and increases to 112 KJ/mol at the final stages. This means that the initial stages are controlled by means of the interfacial chemical reaction, and that the final stages are controlled by means of solid-state diffusion. The reactions occur gradually in two steps, in which the L'VOV-Boudouard reaction ($C + CO_2 \rightarrow 2CO$) is the step which requires a higher control, particularly at low temperatures, whereas most of the effectiveness of the solid-state reaction occurs at high temperatures.

The thermodynamics of the oxide reduction (valid for any of the oxides mentioned in the present specification) by the carbon and by the hydrogen, can be better understood by using the Ellingham diagram, illustrated in FIG. 6.

It can be seen in the diagram that the standard free energy of the carbon oxidation, to form carbon monoxide CO (g) and to form carbon dioxide $CO_2$ (g), are at the same temperature, about 710° C., that is, the two lines of formation of the two carbon oxides intersect at this temperature. Below this temperature, the $CO_2$ (g) is the more active reducing agent, the predominant component of the gaseous phase in equilibrium with the solid carbon and, at high temperatures, the CO becomes the predominant gaseous component.

At low temperatures, the oxide reduction by $H_2$ (indirect reduction) and the carbothermic reduction (self-reduction) occur simultaneously, but the free energy to form $H_2O$ is more negative than to form $CO_2$. That is, at low temperatures, the $H_2O$ is more stable than the $CO_2$, as can be seen in the Ellingham diagram, in FIG. 6. The reduction by the Boudouard reaction becomes favored around 700° C.

Figure 7:
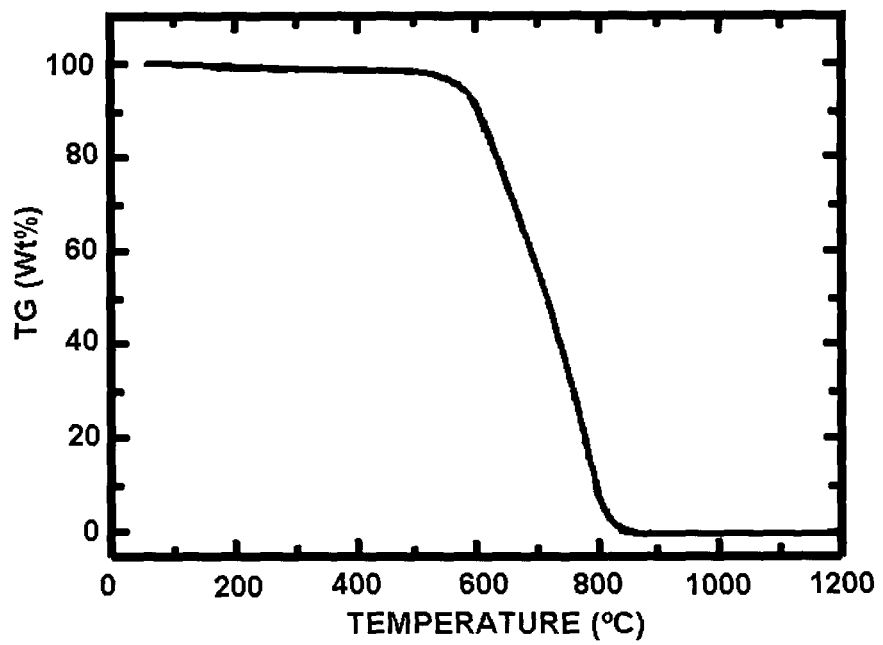
FIG. 7 represents a graph of the TG curve of a sample containing graphite when heated in air, showing the elimination of the graphite by reaction with the oxygen.

The second method proposed and used for the thermal removal of the space holder SH uses, as reducing agent, the ambient atmosphere for the carbon oxidation. The removal of the carbon by oxidation starts at about 600° C. and ends at about 900° C., as can be seen FIG. 7, which shows the mass loss as a function of the temperature determined in a thermogravimetric assay (the carbon is the chemical element which is oxidized—the graphite is the solid material formed with the carbon due to the $sp^2$ bond.

Since the iron oxide is stable at temperatures in which the carbon oxidation occurs (see FIG. 6, Ellingham diagram), during the step of thermally removing the space holder no change occurs in the iron oxide structure; only the formation of sintering contacts occurs between the particles, resulting in a porous material with an iron oxide matrix.

For the intended application of the porous piece, there is the need for a considerable mechanical strength for the body E of the acoustic muffling element. That is why it is not recommended the use of a porous material with a ceramic matrix, that is, with a matrix still in the form of an oxide, for example, iron oxide, it being necessary to reduce the material of the matrix phase MP of the piece being formed, so as to obtain the material in the metallic state which, in the given example, is pure iron.

FIG. 8 illustrates a sample of the metallurgic composition of the invention or of a portion of the piece to be formed, already compacted and conformed and having the space holder particles 20, of the space holder SH, provided with the coating 30 and homogeneously distributed, without shearing, in the ceramic material particles 10 constitutive of the matrix phase MP, before the sintering step.

Figure 9:
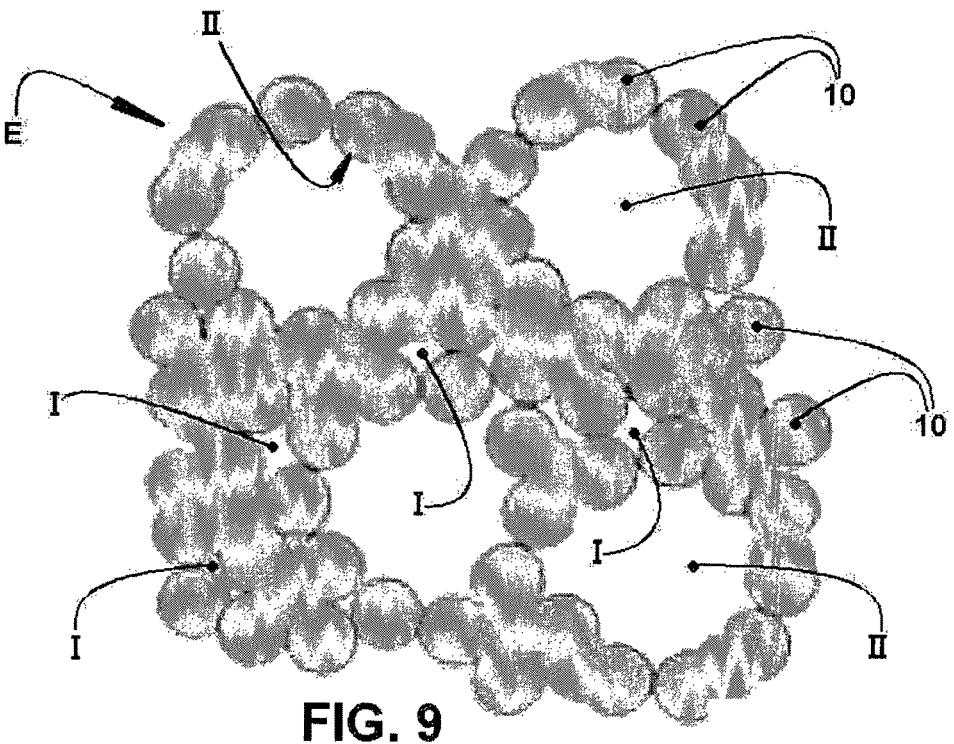

FIG. 9 illustrates the same sample after the sintering and having the space holder particles already reacted with the gas of the ambient atmosphere, for the formation of the open secondary pores II, that is, of the communicating type.

It should be understood that FIG. 9 equally represents a sample after the sintering, in which the space holder particles reacted with the oxygen available in the composition of the matrix phase (self-reduction).

Considering the matrix phase MP exemplified herein as being in iron oxide, the obtention of metallic iron from the hematite phase, using the hydrogen as gaseous reducing agent, occurs in two or three stages which depend on the temperature. At temperatures below 570° C., the reduction occurs in two stages and, above 570° C., in three stages.

The iron reduction by $H_2$ starts by the highest iron oxidation state, the hematite phase, with the following reactions:

$$3Fe_2O_3 + H_2 \rightarrow 2Fe_3O_4 + H_2O \quad \quad 1)$$

$$Fe_3O_4 + 4H_2 \rightarrow 3Fe + 4H_2O \quad \quad 2)$$

$$(1-x)Fe_3O_4 + (1-4x)H_2 \rightarrow 3Fe_{(1-x)}O + (1-4x)H_2O \quad \quad 3)$$

$$Fe_{(1-x)}O + H_2 \rightarrow (1-x)Fe + H_2O \quad \quad 4)$$

The hydrogen is a good reducing agent for oxides of Fe, Ni, Cu, Mo, Sn, Zn, W and Co, since they form not very stable oxides, as can be seen in the Ellingham diagram, in FIG. 6, in which some compounds are exemplified. At high temperatures, such as the sintering temperatures, the atmosphere becomes a reducing atmosphere, as a function of the lower stability of the oxide, promoting the reduction of the material. This last period is applicable to the two methods, since, even if most part of the oxides are reduced by the carbon of the graphite, used as a "space holder", a posterior treatment in hydrogen is required, in order to eliminate the graphite remains and oxide remains, which were not completely eliminated in the self-reduction step.

Figure 10:
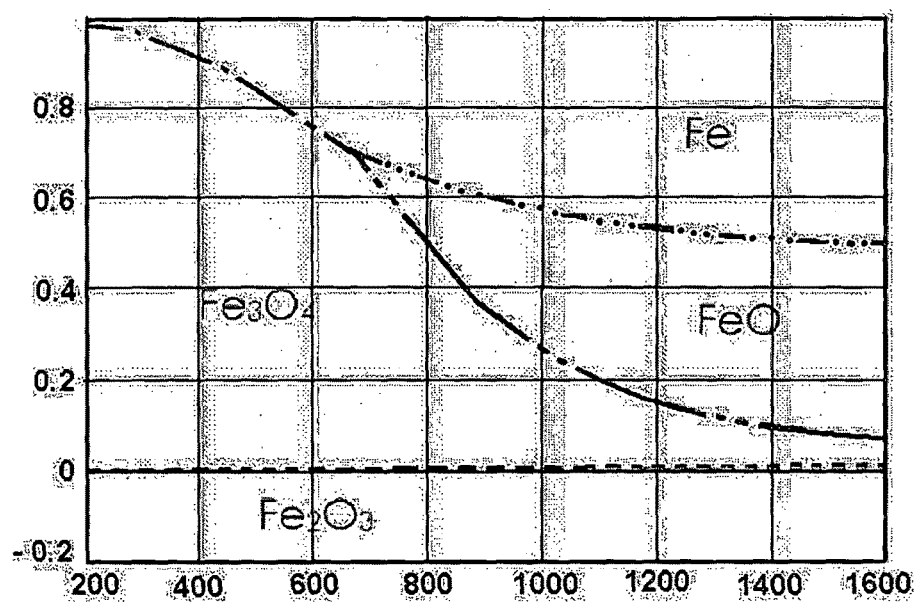
FIG. 10 represents the Chaudron diagram, that is, the stability of the Fe—O—$H_2$ system as a function of the temperature.

The diagram of FIG. 10, known as Chaudron diagram, presents information about the boundaries of occurrence of the iron oxides and of the pure iron, as a function of the temperature.

Figure 11:
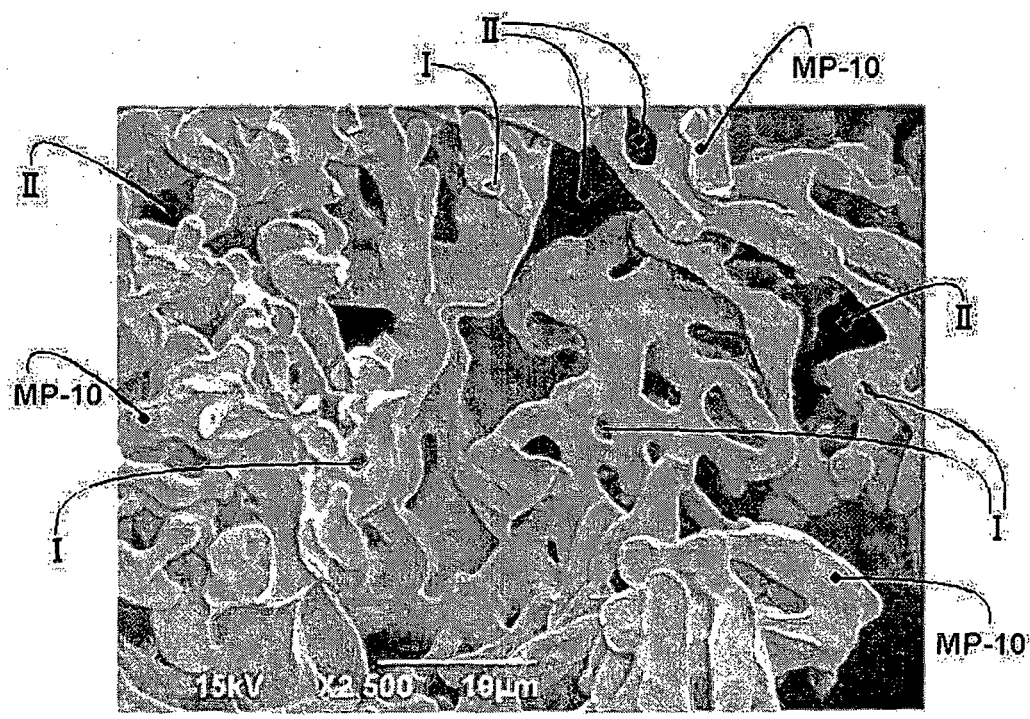
FIG. 11 represents a micrograph by scanning electron microscopy of the compacted metallurgic composition of $Fe_2O_3$/C, after thermal treatment thereof in atmospheric air at 850° C., for elimination of the carbon, followed by a thermochemical treatment for reducing the ceramic porous skeleton to a metallic porous skeleton at 1050° C.

As can be observed in FIG. 11, after eliminating the space holder SH and reducing the oxide used for the formation of the matrix phase MP, the generated porous structure is comprised by two different pore types, according to their origin, as follows:

a—Primary pores I, which are the remaining pores between the ceramic material particles 10 (oxide) of the matrix phase MP, for example, the $Fe_2O_3$. The size of the primary pores I depends on the size and on the size distribution of the ceramic material particles 10 used, and on the processing parameters (compaction pressure, sintering time and temperature); and b—Open secondary pores II, communicating and produced as a consequence of removing the space holder SH defined by the carbon of the space holder particles 20. The size and the shape of the secondary pores II depend on both the size and the shape of the space holder particles 20 of the space holder SH.

The invention claimed is:

1. A process for manufacturing a metallic porous body, by powder metallurgy and having open primary and secondary pores, characterized in that it comprises the steps of:
    mixing, homogeneously and in predetermined quantities, a load of oxide ceramic particles, with a load of space holder particles, defined by graphite particles;
    compacting said mixture formed by oxide ceramic particles and space holder particles, in order to form a compact body to be sintered and having the primary pores; and
    sintering said compact body, so that the oxide ceramic particles form sintering contacts with each other, the carbon of the space holder particles reacting with oxygen available in the sintering medium, eliminating the space holder particles and forming the open secondary pores;
    wherein the sintering of the compact body is carried out in atmospheric air flow at temperatures from 600° C. to 900° C., causing the reaction of the carbon of the space holder particles with the oxygen available at the atmosphere reigning in the sintering medium, producing the elimination of the space holder particles from the compact body being sintered, forming an oxide ceramic porous skeleton with the open secondary pores, said process further including the subsequent step of submitting the oxide ceramic porous skeleton to a thermochemical treatment in a reducing gas maintained at a temperature defined between 570° C. and 1100° C., so as to transform the oxide ceramic porous skeleton into a porous metallic body.

2. The process, as set forth in claim 1, characterized in that the thermochemical treatment of the oxide ceramic porous skeleton is carried out with a gaseous reducing agent selected from carbon and hydrogen.

3. The process, as set forth in claim 1, characterized in that the space holder graphite particles are coated with a polymer coating, before being mixed to the oxide ceramic particles, keeping the original shape thereof during the steps of mixing and compacting said space holder graphite particles and the oxide ceramic particles.

4. The process, as set forth in claim 1, characterized in that the oxide ceramic particles are obtained from any of the oxides of Fe, Ni, Cu, Sn, Zn, and mixtures thereof.

5. The process, as set forth in claim 1, characterized in that the oxide ceramic particles present a dimension between 0.01 µm and 15 µm (micrometers) and in that the space holder graphite particles present a dimension from 15 µm to 150 µm (micrometers).

* * * * *